United States Patent [19]

Whyte et al.

[11] 3,924,223

[45] Dec. 2, 1975

[54] POWER LINE COMMUNICATION SYSTEM HAVING A PROTECTIVE TERMINATING IMPEDANCE ARRANGEMENT

[75] Inventors: Ian A. Whyte, Pittsburgh; Leonard C. Vercellotti, Verona, both of Pa.

[73] Assignee: Westinghouse Electric Corporation, Pittsburgh, Pa.

[22] Filed: Feb. 21, 1974

[21] Appl. No.: 444,587

[52] U.S. Cl. ............ 340/310 R; 333/705; 336/175; 307/147; 307/1

[51] Int. Cl.² ......................................... H04M 11/04

[58] Field of Search ............ 340/310 A, 310 R, 150, 340/151; 333/24 C, 77, 79, 1, 2, 12; 328/165, 138; 324/57 R

[56] References Cited

UNITED STATES PATENTS

| | | | |
|---|---|---|---|
| 1,935,439 | 11/1933 | Falla | 340/310 A |
| 2,032,360 | 3/1936 | Green | 340/310 A |
| 3,025,480 | 3/1962 | Guanella | 333/24 G |
| 3,701,011 | 10/1972 | Biagi | 324/95 |
| 3,702,460 | 11/1972 | Blose | 340/150 |

*Primary Examiner*—Thomas B. Habecker
*Attorney, Agent, or Firm*—R. W. Smith

[57] ABSTRACT

A terminating impedance network is disclosed for communication signals transmitted by a power line carrier communication system to the premises of residential customers of an electric utility. Corrective impedance values suitable for communication signal terminations are established in the power line conductors serving the customer loads from a distribution network. Frequency sensitive low impedance values are established across the service conductors adjacent the customer loads to protect the communication system from interfering signals and high frequency noise originating in the customer loads.

9 Claims, 4 Drawing Figures

POWER LINE COMMUNICATION SYSTEM HAVING A PROTECTIVE TERMINATING IMPEDANCE ARRANGEMENT

CROSS REFERENCE TO RELATED APPLICATIONS

The present application is related to U.S. Pat. application Ser. No. 444,583 filed Feb. 2, 1974, by I. A. Whyte concurrently with this application and is assigned to the assignee of this invention.

BACKGROUND OF THE INVENTION

This invention relates to power line carrier communication systems of the type transmitting carrier communication signals through the power lines of a distribution network directly to customers of an electric utility and more particularly, to a distribution network power line carrier communication system including terminating impedance networks connected to the power line conductors serving the electric loads of customers receiving power line communication signals otherwise subject to adverse signal impedance terminations due to short circuited and varying customer load conditions and interfering signals occurring in the customer loads.

A distribution network power line carrier communication system is disclosed in copending application Ser. No. 425,759 filed Dec. 18, 1973, by I. A. Whyte and assigned to the assignee of this invention, in which transmitters, receivers and frequency translating and signal reconditioning repeaters are described for transmitting communication signals between a substation and residential customers of an electric utility company through the power line conductors of a power distribution network. This power line communication link with the residential electric power customers provides remote meter readings and/or selective load control of the customer loads.

A communication terminal is provided at each customer including the transmitter and the receiver described in the aforementioned application which are coupled to the customer's service conductors. As is known, service conductors interconnect the secondary power lines of a distribution network and the customer wiring and electric loads. Accordingly, the communication signals transmitted to the customer premises have signal impedance terminations including the combined impedances of the service conductors, a watthour meter usually connected thereto and the customer wiring and electric loads. These customer impedances present widely varying and often adversely low impedance values to the high frequency communication signals. Therefore, efficient and suitable impedance matching of the customer's transmitter and receiver is difficult to accomplish. For example, the impedance at the communication signal frequencies of a watthour meter is usually in the order of 1 to 2 ohms. The customer electric loads often vary from a maxium impedance in the order of 50 ohms to a minimum impedance at the signal frequencies in the order of 0.5 ohm, however, the impedance variations are quite random and unpredictable.

With the power line communication system transmitting carrier signals to large numbers of customers, efficient operation of the system requires that signal impedance terminations at each customer be relatively high and substantially constant. This aids in accomplishing more efficient and proper impedance matching at the customer's receivers and transmitters to avoid substantial losses and attenuation of the signal power levels. Such impedance matching is difficult when the combined customer impedance variations at the communication signal frequencies have a ratio of approximately thirty to one with impedance values indicated above. Also, it is also required to isolate the power line communication signals from low and virtually short circuit impedance conditions which can occur in the customer electric loads. The customer low impedance conditions require substantially higher signal power so that the received communication signals have acceptable voltage levels at the input of a customer receiver.

A further adverse condition to be protected against at the customer terminal end of a power line communication system is interfering high frequency signals which may originate in customer loads including home inter-com systems, or high frequency noise generating sources, or unauthorized signal generators intentionally connected at the customer premises to disrupt the reception or transmission of the communication signals being transmitted over the distribution network serving the customer. Connection of a frequency responsive signal bypass in parallel with the customer loads provides low impedance paths to ground at the communication signal frequencies to confine the interfering signals.

In a related application Ser. No. 444,583, filed Feb. 2, 1974, by I. A. Whyte filed concurrently with this application and assigned to the assignee of this invention, an improved watthour metering circuit is described and claimed having integral terminating impedance networks which provide high impedance elements at high frequencies for suitable impedance termination of power line communication signals transmitted to a power customer and the network also includes low impedance elements at high frequencies to bypass interfering signals originating in customer loads.

SUMMARY OF THE INVENTION

In accordance with the present invention a distribution network power line carrier communication system includes an improved terminating impedance network connected to the power line conductors of a utility company customer between the customer electric loads and the customer's communication terminal. The terminating impedance network includes high series impedance elements including an inductance or inductance-capacitance parallel resonant connected circuit elements tuned to the power line communication signal frequencies so as to provide a predetermined increased value of signal impedance. Higher and more constant terminating impedance values are presented to the communication signals received at a customer's power line signal termination without substantial voltage drops or power losses at the electrical power frequencies. The inductance elements are formed by ferrite magnetic core members secured around a customer's power line service conductors interconnecting the customer electric loads and a distribution power line network. The parallel resonant circuits are provided by ferrite magnetic core members having a power line conductor extending through the center opening of the core member with a capacitor being transformer coupled in parallel so that the parallel resonant circuit is tuned to the communication signal frequencies.

The improved terminating impedance network further includes low protective impedance elements at the communication signal frequencies which are formed by capacitance elements connected across the the customer power line service conductors so as to be connected in parallel with the customer's electric loads. A predetermined value of capacitance confines interfering high frequency signals originating in the customer loads when the interfering signals have frequencies in the same frequency range as the communication signals. The capacitance elements have small or negligible current drain at the electric power frequency. When a lower predetermined value of impedance is desired, an inductance-capacitance series resonant circuit is connected across the customer's power line service conductors with the series resonant circuit being tuned to the frequencies of the communication signals.

It is a general feature of this invention to provide a terminating impedance network for properly terminating and protecting communication signals transmitted to a customer's premises from a power distribution network without substantial voltage and power losses in the electrical power supplying the customer's electric loads. Another feature of this invention is to provide an increased series impedance path at the frequencies of power line carrier communication signals wherein an inductor device formed by a magnetic core member is assembled around a customer's power line service conductor extending between the customer electric loads and a power line distribution network transmitting carrier communicaton signals and wherein the magnetic core member can also form a tuned inductance element of a parallel resonant circuit when a tuned capacitance element is coupled to it to provide higher resonant circuit impedance values. A still further feature of this invention is to provide a parallel low protective impedance path in combination with a high series impedance path in a terminating impedance network in which the parallel signal path includes a capacitance element which bypasses interfering signals having frequencies in the same range as a communication signal when the interfering signals are generated at a source at the customer premises. Other features and advantages of this invention will be apparent from the detailed description of the embodiment of this invention as shown in the drawings.

DESCRIPTION OF THE PREFERRED EMBODIMENT

Figure 1:
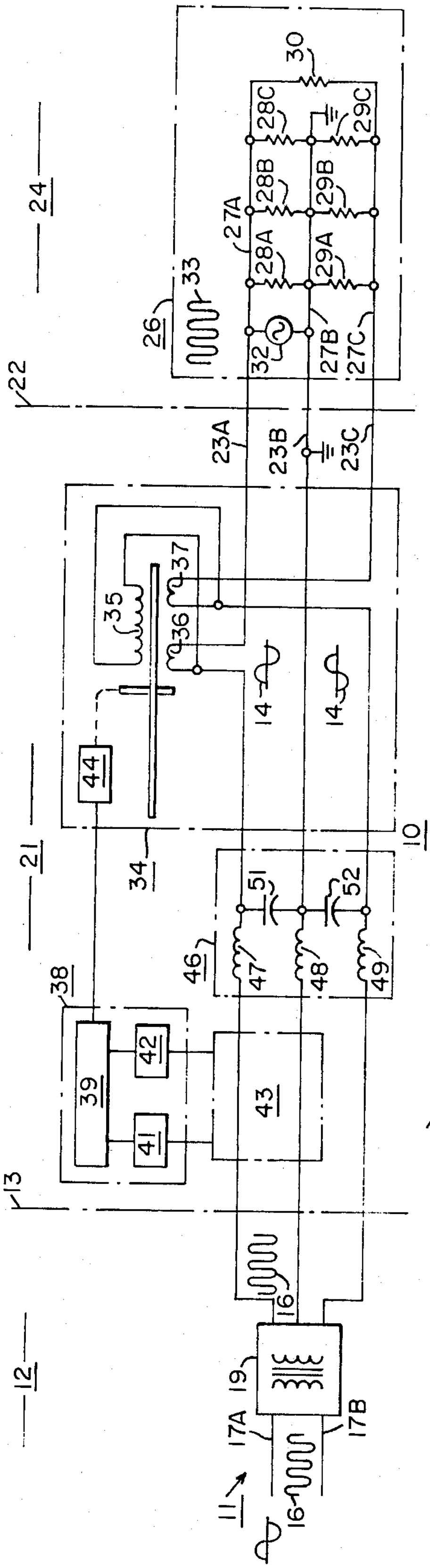
FIG. 1 is an electrical schematic diagram of a utility company customer's power line terminating connections which are connected to a distribution network included in a power line carrier communication system and which include a terminating impedance network made in accordance with this invention.

Referring now to the drawings, wherein the same numeral designates like or corresponding elements in the several figures, and more particularly to FIG. 1 wherein there is shown an electrical schematic diagram of a utility customer connections 10 forming terminating loads of an electric power transmission and distribution system. The customer connections 10 represent many terminating or load end connections of an electric power system occurring, for example, at a large number of residential customers. It is noted, however, that the present invention, as described in detail hereinbelow, is of general applicaton and is not limited to use at only residential type power customers. A fragmentary portion of a distribution network 11 is shown in a section 12 of FIG. 1 that is designated at the left-hand side of the dashed line 13. The distribution network 11 transmits 60 Hz. electric power 14 and is included in a power line carrier communication system of a type, for example, as disclosed and claimed in application Ser. No. 425,759 by I. A. Whyte filed Dec. 18, 1973, and assigned to the assignee of this invention. Accordingly, modulated high frequency carrier communication signals 16 are transmitted from a central interrogating station, not shown, over the primary distribution conductors 17A and 17B. The communication signals 16 are of a type having a frequency range in the order of 20 kHz. to 400 kHz., of a suitable bandwidth, and suitably modulated by digital data baseband signals such as by frequency shift keying, as described in the aforementioned application. The distribution network 11 includes a voltage step-down distribution transformer 19 to supply the electric power 14 at appropriate power voltages, usually 120 and 240 volts, to a three-wire secondary portion of the network 11 that also transmits the signals 16.

An interconnecting section 21 is designated between the dashed line 13 and dashed line 22 in the schematic diagram of FIG. 1. The section 21 typically includes service conductors 23A, 23B and 23C connecting the secondary of the distribution network 11 to a customer's premises including a section 24 in FIG. 1 at the right-hand side of the dashed line 22. A customer electric load 26 is included in the section 24 and includes wiring conductors 27A, 27B and 27C connected, as shown, to the substantially all resistance load devices 28A, 28B, 28C and 29A, 29B, 29C and 30. Service entrance equipment, not shown, including a main switch and fuses typically connect the customer wiring conductors 27A, 27B and 27C to the service conductors 23A, 23B and 23C, respectively. The conductors 23B and 27B are grounded in normal practice by being connected to earth grounds as shown in FIG. 1.

A high frequency signaling device 32 is shown connected in the customer load 26 and the device 32 can be formed by a home inter-com system or other signal generating source including high frequency electrical noise. The signaling device 32 is to be understood to be capable of generating a signal 33 which includes frequencies which are in the frequency bandwidth of the carrier communication signal 16 and is capable of interfering or jamming the signal 16 or other carrier communication signals associated with a power line carrier communication system connected to the distribution network 11. The load devices 28A, 28B and 28C, and 29A, 29B and 29C are rated at 120 volts and are connected between the conductors 27A and 27B and between conductors 27C and 27B, respectively, and the device 30, which may be optionally included in the customer load 26, is rated at 240 volts and is connected between the line conductors 27A and 27C. These load devices typically include switches, not shown, for use at randomly different times so that the customer electric load 26 has impedance variations from a condition of low impedance in the order of 0.5 ohm or a virtually short circuited condition, to a condition of maximum impedance in the order of 50 ohms.

Referring further to the customer interconnecting power line section 21, an induction watthour meter 34 of a conventional design is normally connected to the service conductors 23A and 23C for measuring the consumption of electrical energy by the customer electric load 26. A voltage measuring coil 35 is connected across the conductors 23A and 23C and two current measuring coils 36 and 37 are connected in series with the line conductors 23A and 23C as shown. The current coils 36 and 37 have very low impedances in the order of approximately 1 ohm at the communication signal frequencies while the voltage coil is formed by a winding having a large number of turns of a small conductor so as to present a high impedance across the power line conductors. The watthour meter coils are effective to drive a rotating disc at a rate corresponding to the consumption of electrical energy as is well understood.

The section 21 also includes a power line communication terminal 38 of a type located at a remote customer location, also referred to as a response communiction terminal as described in the aformentioned application Ser. No. 425,759 filed Dec. 18, 1973. The communication terminal 38 includes a logic circuit 39 which may include a pulse accumulating counter and encoder circuit as disclosed in application Ser. No. 291,469 by L. C. Vercellotti et al filed Sept. 22, 1972, now U.S. Pat. No. 3,820,073 issued June 25, 1974. A transmitter 41 and a receiver 42 of the communication terminal 38 are coupled to a pair of the service conductors typically including a line conductor such as 23A and the grounded conductor 23B by a coupler 43. The logic circuit 39 receives pulses from a pulse generator 44 in the watthour meter 34 for transmitting remote meter reading information to the central interrogation communication terminal, not shown, associated with the power line communication system connected to the distribution network 11. Accordingly, the communication signals 16 represent a bandwidth of signals transmitted and received at the communication terminal 38 and coupled by the coupler 43 for transmission to and from the distribution network power line carrier communication system associated with the network conductors 17A and 17B.

Referring now to an improved terminating impedance network 46 which is made in accordance with a principal feature of this invention, the network 46 protects and improves the impedance terminations of the communication signals 16 of the power line communication system transmitted to the customer as described hereinafter. The terminating impedance network 46 is preferably connected in the section 21 and to the service conductors 23A, 23B and 23C at the distribution secondary side of the connections to the watthour meter 34, so that any power losses of the network 46 are not measured by the customer's meter. The network is further located on the customer load side of the coupler 43 and the communication terminal 38 to more suitably terminate the signals 16 and protect them from the load 26. The network 46 presents high signal impedance in the series path of the signals 16. Inductor devices 47, 48 and 49 present predetermined inductance valued circuit elements connected in series with the service conductors 23A, 23B and 23C, respectively.

The network 46 also includes a low protective impedance in a parallel path to ground for the signals 16. Capacitors 51 and 52 provide predetermined valued capacitance circuit elements connected between the grounded service conductor 23B and the service conductors 23B and 23C, respectively, as shown. It is important that the capacitors 51 and 52 are connected between the inductors 47, 48 and 49 and the customer load 26 and in the parallel relationship with the customer load devices as shown. The inductance values of the inductor devices 47, 48 and 49 and the capacitance values of the capacitors 51 and 52 are selected, as illustrated by the exemplary embodiments described in detail hereinbelow, so as to provide the desired termination and protective impedances values at the frequencies of the communication signal 16 while having minimal or substantially negligible power current drain, power losses and voltage drops by the electric power 14.

Figure 2:
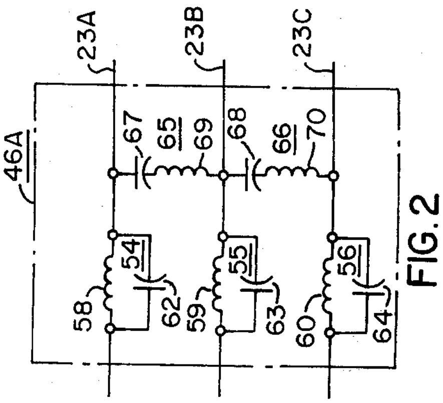
FIG. 2 is an electrical schematic diagram of an alternative embodiment of the terminating impedance network shown in FIG. 1.

FIG. 2 illustrates an electrical schematic diagram of another preferred embodiment of a protective terminating impedance network 46A made in accordance with the present invention to accommodate a wider variety of signal impedance termination values. The network 46A is intended to replace the network 46 at the same aforementioned connection to the service conductors 23A, 23B and 23C. Three inductance-capacitance (L-C) parallel resonant circuits 54, 55 and 56 including inductor devices 58, 59 and 60 and capacitors 62, 63 and 64 as shown which are tuned to the mid-frequency of the bandwidth of the communication signals 16. The circuits 54, 55 and 56 are connected in series with the conductors 23A, 23B and 23C, respectively. The parallel resonant circuits form the high series impedances of the network 46A to present higher values of impedance than are presented at a given frequency of interest for the signals 16 than by the single inductor devices 47, 48 and 49.

The terminating impedance network 46A further has two inductance-capacitance (L-C) series resonant circuits 65 and 66 for replacing the single capacitors 51 and 52 in the network 46 and, accordingly, they are connected across the service conductors 23A and 23B and across the conductors 23C and 23B, respectively. The series resonant circuits 65 and 66 include capacitors 67 and 68 and inductors 69 and 70, respectively, having predetermined capacitance and inductance values series tuned to the mid-frequencies of the bandwidth of the communication signals 16. Lower values of signal impedance are presented in the signal path of the network 46A at a given frequency of interest than is possible with the single capacitors 51 and 52 of the network 46. The capacitors 67 and 68 and the inductors 69 and 70 can be provided by discrete conventional capacitance and inductance elements connected at a convenient point such as at the service entrance equipment directly across the service conductors 23A, 23B and 23C as described hereinabove.

Figure 4:
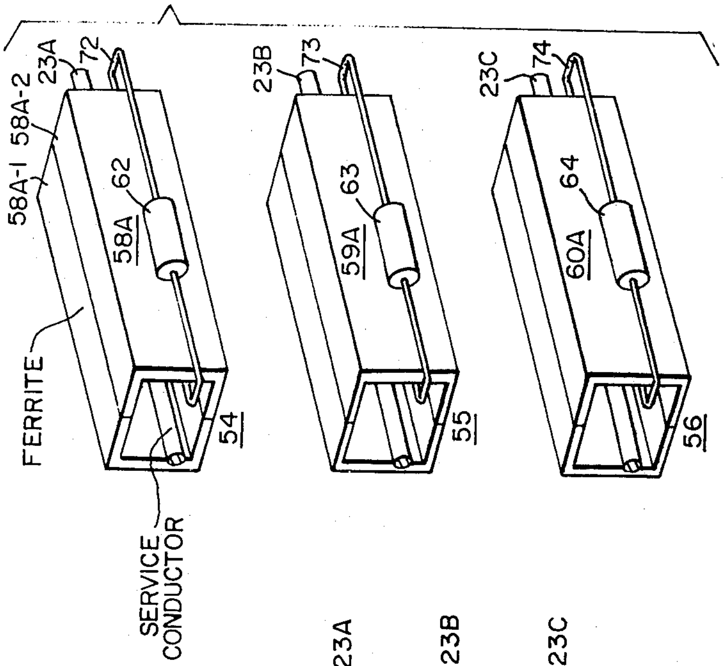
FIG. 4 is a perspective view of a magnetic core inductor device forming a tuned element of a parallel resonant circuit including a capacitor coupled to the inductor device in the terminating impedance network illustrated in FIG. 2.
Figure 3:
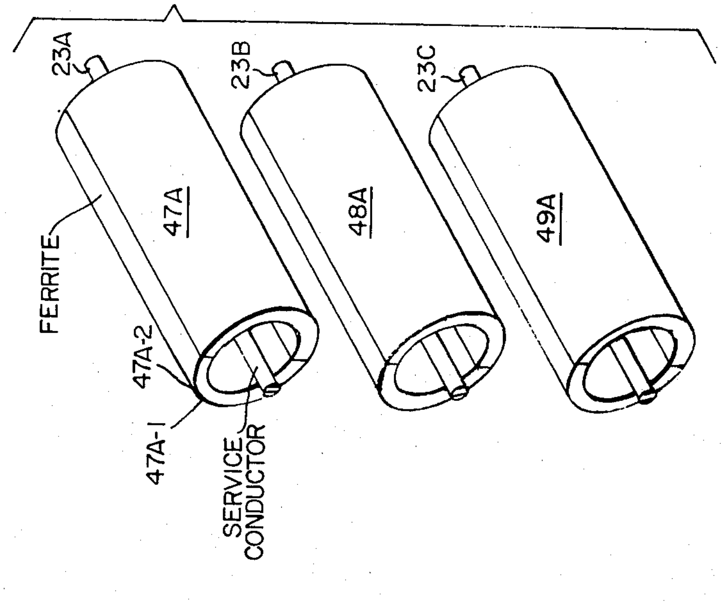
FIG. 3 is a perspective view of a magnetic core inductor device included in the terminating impedance network illustrated in FIG. 1.

Referring now to FIGS. 3 and 4 wherein there is illustrated further important features of the present invention wherein hollow magnetic tubular core members 47A, 48A and 49A shown in FIG. 3 are made of a high frequency magnetic core material such as powdered iron or more preferably a ferrite magnetic material. The conductors 23A, 23B and 23C extend through the hollow center portions of the tubular magnetic core members 47A, 48A and 49A, respectively, to form the inductor devices 47, 48 and 49 shown in the network 46 in FIG. 1. The magnetic core members 47A, 48A and 49A have a hollow cylindrical shape formed by two identical semi-cylindrical halves, such as designated 47A-1 and 47A-2 at the core member 47A. The dimensions of the core members are made to have a predetermined value of inductance to form the desired high series impedance for the signals 16 which if formed by conventional electrical circuit inductance elements would be quite large and often quite expensive. Suitable thicknesses of the magnetic cores 47A, 48A and 49A have been found to be in the order of a fraction of an inch, for example about 0.25 inch and suitable lengths are provided in an approximate range of 1½ to 4 inches to have the predetermined inductance impedance to be provided at a frequency of interest which may be established as described further hereinbelow.

FIG. 4 illustrates a preferred embodiment of the resonant circuits 54, 55 and 56 included in the terminating impedance network 46A shown in FIG. 2. Hollow rectangular cross-sectionally shaped tubular magnetic core members 58A, 59A and 60A are made of a suitable high frequency magnetic core material such as powdered iron or preferably a ferrite magnetic material for surrounding the conductors 23A, 23B and 23C. The members 58A, 59A and 60A correspondingly form the predetermined value of inductance for the tuned inductor devices 58, 59 and 60, respectively, described in connection with the description of FIG. 2. The rectangular shape of the magnetic core members 58A, 59A and 60A is preferably made into two halves as indicated by the halves 58A-1 and 58A-2 designated at the magnetic core member 58A in FIG. 4. The thickness, as described for the magnetic core members of FIG. 3 may be in the order of a fraction of an inch, for example in the order of 0.25 inch, and have combined height, width and length dimensions to provide the predetermined tuned inductance impedance characteristics for the resonant circuits 54, 55 and 56 as also noted further hereinbelow. It is apparent to those skilled in the art that the same or similar hollow rectangular cross-sectional configuration of the tubular magnetic core members 58A, 59A and 60A or other elongated, hollow noncircular cross-sectional form may be used to provide the tubular magnetic core members 47A, 48A and 49A shown in FIG. 3 having a hollow circular configuration and vice versa. Accordingly, the term tubular as used herein and in the claims is to include a configuration that is hollow and has a substantially constant cross-section along an elongated length.

The capacitors 62, 63 and 64 shown in FIG. 4 form the resonant circuits 54, 55 and 56 by being transformer coupled with the magnetic core members 58A, 59A and 60A by conductor loops 72, 73 and 74 connected to the opposite ends of the capacitors and extending in magnetically coupled relationship through the hollow centers of the magnetic core members.

It is an important advantage of this invention that the magnetic core members shown in FIGS. 3 and 4 form the inductor devices included in the terminating impedance networks 46 and 46A in FIGS. 1 and 2 in an inexpensive manner to provide the desired values of inductances. It is a further important advantage that the magnetic core members are installed to the service conductors 23A, 23B and 23C without having to disconnect or cut the conductors, accordingly they can be installed while these conductors are energized. This is particularly advantageous since it is desirable that the inductor devices forming the high series impedances for the signals 16 in the networks 46 and 46A be provided toward the distribution network 11 relative to the watthour meter connections where often it is not convenient to break a conductor so as to have a separate inductance element connected in series therewith.

In practicing the present invention there are a number of variable conditions at the customer terminating connections 10 which determine the different values to be used for the inductance and capacitance elements of the different embodiments in the circuits of the terminating impedance networks 46 and 46A illustrated in FIGS. 1 and 2. As noted hereinabove, either of the high series impedances for the signals 16 being formed by the single inductors in the network 46 or the parallel resonant circuits included in the network 46A may be used in combination with either of the low protective impedances for confining the interfering signals 33 as provided by either the single capacitors or the series resonant circuits of the networks 46 and 46A, respectively. An initial consideration in determining the value of the magnetic core inductor devices 47, 48 and 49 is made by the limitation of permissible voltage drop of the electric power 14 conducted through the inductor devices at the power frequency. Also, in the initial consideration of the inductance values $L_{47}$, $L_{48}$ and $L_{49}$ of the inductor devices 47, 48 and 49 respectively, the inductances $L_{47}$ and $L_{49}$ are assumed to equal each other and to twice the inductance $L_{48}$ since under balanced load conditions the grounded service conductor 23B will conduct twice the current of the conductors 23A and 23C since it is a return path for both of the line service conductors. Further, only the impedances of the terminating impedance networks 46 and 46A which are connected with the service conductors 23A and 23B will be considered since it is these conductors which are conducting the communication signals 16 in FIG. 1. With the aforementioned conditions in mind, the equation $$Vd = 2\pi f_{60}(i_{max})(L_{47} + L_{48})$$

is used to determine the inductances $L_{47}$ and $L_{48}$ at the permissible voltage drop $Vd$ across the inductor devices 47 and 48, where $i_{max}$ is the maximum power current flowing through the inductors and $f_{60}$ is the 60 Hz. frequency of the electric power 14.

Upon determining the inductance values for the inductor devices 47 and 48 at the desired value of Vd, the desired value of impedance to be presented by the high series impedances of the network 46 or 46A is then determined. It is desirable that the series signal termination impedance at a frequency of interest of the communication signal 16 is somewhat higher than the maximum impedance of the customer load 26. Typically, the load 26 is in the order of 50 ohms and is subject to random variations to low impedance values in the order of 0.5 ohm, as noted hereinabove. The series impedance equation $$Z_s = 2\pi f_s(L_{47} + L_{48})$$

is used for inductors 47 and 48 where $Z_s$ is equal to the desired impedance at the communication signal frequency, $f_s$ is the frequency of interest of the communication signal 16, and the values of the inductances $L_{47}$ and $L_{48}$ have been established in accordance with the permissible voltage drops described immediately hereinabove. If the value obtained for $Z_s$ is greater than the desired series signal impedance then the inductor devices 47 and 48 would be used as shown in the network 46. However, if the value of $Z_s$ is less than the desired series signal impedance desired, then the parallel resonant circuits 54 and 55 must be used. It is found that more commonly it is necessary to utilize the parallel resonant circuits 54 and 55 included in the network 46A. To determine the quality or $Q$ factor of the inductor devices which are used in the parallel resonant circuits 54 and 55 the equation $$Z = 2\pi f_s\, Q\, (L_{58} + L_{59})$$

wherein $Z$ is the desired parallel resonant circuit signal impedance to be provided and the inductances $L_{58}$ and $L_{59}$ would be equal to the inductances determined for the inductances $L_{47}$ and $L_{48}$, respectively. It is preferable to have a series impedance in an approximate range of 50 to 600 ohms at the communication signal frequencies.

Referring now to the low protective impedances provided by the capacitors 51 and 52 and the terminating impedance network 46 and the series resonant circuits 65 and 66 included in the network 46A. Only the capacitance $C_{51}$ is considered since it is connected across both of the conductors 23A and 23B transmitting the communication signals 16 and the capacitances are to be equal. Usually a single capacitor rather than the series resonant circuit will provide a desired low impedance value to the signal frequencies of interest. The desired low protective impedance value $Z_p$ is determined by the equation $$Z_p = 1/(2\pi f_s C_{51})$$

where the frequency $f_s$ is equal to the carrier signal frequency and $C_{51}$ is the capacitance of the capacitor 51. If the desired low protective impedance is to be lower than provided by the above equation at the frequencies of interest then the series resonant circuit 65 of the network 46A must be utilized. The use of the capacitor 51 or the capacitor 67 of the series resonant circuit 65 assures that there is only small current drain of the 60 Hz. electric power. It is preferable that the parallel protective impedance be one ohm or less at the communication signal frequencies.

Illustrative values for the inductances and capacitance of the circuits forming the terminating impedance networks 46 and 46A are now set forth hereinafter for purposes of explaining the present invention and are not to be considered as limitations since many other alternative values and arrangements are possible due to the varying frequencies of the communication signal 16 and customer terminating impedance conditions occurring in various distribution line arrangements at a customer's premises.

If initially it is determined that the maximum permissible voltage drop $Vd$ is to be 1.5 volts and the maximum current $i_{max}$ is equal to 200 amperes, then at the electric power frequency of 60 Hz., the inductance $L_{47}$ of the inductor 47 is approximately equal to seventeen microhenrys and inductance $L_{48}$ of the inductor 48 is approximately equal to 8.5 microhenrys. The series impedance for these values of inductors 47 and 48 at the power frequency will be approximately 0.01 ohm.

If the desired series signal impedance is to be 630 ohms and the communication signal of interest $f_s$ is equal to 100 kHz., it is found from the above equation for $Z_s$ that the impedance present by the inductors 47 and 48 at the carrier signal frequency of 100 kHz is substantially less than 630 ohms. Consequently, when the parallel tuned circuits 54 and 55 of the network 46A are used and the inductor devices 58 and 59 have the values of inductances found for the inductors 47 and 48 i.e. 17 and 8.5 microhenrys noted above and the inductor devices 58 and 59 have a quality or Q factor of 40 and the capacitors 62 and 63 have values of approximately 0.14 microfarads, the required impedance of 630 ohms will be provided at the carrier signal frequency of 100 kHz. The signal series impedance variations are then between essentially 630 and 650 ohms with the random changes in the customer loads.

If it is assumed that the desired low protective impedance of for bypassing interfering signals is to be in the order of 0.58 ohm, then the capacitor 51 may be used having a capacitance of approximately 3 microfarads. At the power frequency of 60 Hz. the current drain of the electric power 14 is in the order 12 milliamps rms which is sufficiently small to be considered negligible.

In accordance with the above explanation, a working embodiment of the parallel resonant circuit 54, shown in FIG. 4 includes the magnetic core member 58A made of a ferrite material with dimensions including a height in the order of approximately 1¾ inch, a width of approximately 2⅛ inches and a length of approximately 2½ inches. These dimensions provide an inductance of 30 microhenrys. The capacitor 62 coupled to the magnetic core 58A has a value of 0.085 microfarads for tuning to a communication signal frequency of 120 kHz.

Accordingly, it is seen that an improvement is made for the termination of power line carrier signals transmitted to a customer's premises which are protected from very low and widely varying impedance customer load conditions and interfering signals originating in the customer loads. Other modifications and embodiments will be apparent to those skilled in the art without departing from the spirit and scope of this invention.

We claim:

1. A power line communication system transmitting high frequency carrier communication signals through power line conductors of a distribution network supplying power to electric loads at the premises of an electric utility customer with the customer electric loads characterized by varying impedance values and at least periodically being at very low impedance values, wherein the system comprises:

a plurality of service conductors including line and grounded conductors at the customer premises connecting the power line conductors of said distribution network to the customer electric loads so as to supply electric power to the loads while concurrently having said high frequency carrier communication signals transmitted thereon;

a communication terminal coupled to a pair of said service conductors including at least one line conductor for transmitting and receiving said high frequency carrier communication signals through said service conductors; and means forming a terminating impedance in the service conductors at the premises of the utility customer including tubular magnetic core means, said at least one line conductor passing through said tubular magnetic core means at a location intermediate said communication terminal and said customer electric loads, and said magnetic core means effecting a predetermined inductance having a substantially increased value of impedance at the frequencies of the communication signal relative to the very low impedance values of said customer electric loads.

2. A power line communication system as claimed in claim 1 wherein the means forming the terminating impedance includes parallel resonant circuit means formed by a capacitor means being transformer coupled to the magnetic core means, and said parallel resonant circuit means being tuned to the frequencies of the high frequency carrier communication signals.

3. A power line communication system as claimed in claim 1 including a capacitor connected across said service conductors at an intermediate location between the magnetic core means and the customer loads so as to be in parallel with the loads, said capacitor having a predetermined capacitance so as to present a substantially lower value of impedance at the frequencies of the communication signals relative to higher impedance values of said customer electric loads and being in the order of one ohm or less so as to provide a bypass path for interfering signals orginating at the customer loads in the frequency range of the communication signals.

4. A power line communication system as claimed in claim 3 wherein the means forming the terminating impedance includes an inductance connected in series with said capacitor so as to form a series resonant circuit tuned to the frequencies of the high frequency carrier communication signals.

5. A power line communication system as claimed in claim 1 wherein the tubular magnetic core means is made of a ferrite magnetic material, and further wherein the magnetic core means is made of two substantially identical halves each substantially enclosing one half of the associated service conductor.

6. A power line communication system as claimed in claim 5 wherein the the magnetic material has a thickness in the order of 0.25 inch.

7. A power line communication system as claimed in claim 1 including a watthour meter connected to the service conductors between the means forming the terminating impedance and the customer loads.

8. A power line communication system as claimed in claim 1 wherein each of said service conductors passes through the magnetic core means at the intermediate location, the magnetic core means effecting separate predetermined inductances in each of the service conductors so that the predetermined inductances have impedance values that are substantially increased at the communication signal frequencies relative to the low impedance values of the customer electric loads.

9. A power line communication system as claimed in claim 8 wherein the increased impedance values effected by the magnetic core means is in a range in the order of 50 to 600 ohms.

* * * * *